US012641341B2

(12) United States Patent
Miyamoto et al.

(10) Patent No.: US 12,641,341 B2
(45) Date of Patent: May 26, 2026

(54) LENS DEVICE, CONTROL METHOD, AND IMAGING SYSTEM

(71) Applicant: SONY GROUP CORPORATION, Tokyo (JP)

(72) Inventors: Kohei Miyamoto, Tokyo (JP); Yuki Mizuno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 18/849,633

(22) PCT Filed: Mar. 14, 2023

(86) PCT No.: PCT/JP2023/009879
§ 371 (c)(1),
(2) Date: Sep. 23, 2024

(87) PCT Pub. No.: WO2023/189552
PCT Pub. Date: Oct. 5, 2023

(65) Prior Publication Data
US 2025/0203209 A1 Jun. 19, 2025

(30) Foreign Application Priority Data
Mar. 31, 2022 (JP) ................................. 2022-060690

(51) Int. Cl.
*H04N 23/69* (2023.01)
*H04N 23/55* (2023.01)
(52) U.S. Cl.
CPC ............. *H04N 23/69* (2023.01); *H04N 23/55* (2023.01)
(58) Field of Classification Search
CPC ........ H04N 23/69; H04N 23/55; H04N 23/60; H04N 23/50; G03B 13/36
See application file for complete search history.

(56) References Cited

U.S. PATENT DOCUMENTS 9,838,589 B2 * 12/2017 Kishida ................ H04N 23/663
2017/0237893 A1 * 8/2017 Kishida .............. H04N 25/7795
348/240.3

FOREIGN PATENT DOCUMENTS

JP 2009-042475 A 2/2009
JP 2011-257699 A 12/2011
(Continued)

OTHER PUBLICATIONS

International Search Report and Written Opinion of PCT Application No. PCT/JP2023/009879, issued on May 16, 2023, 09 pages of ISRWO.

*Primary Examiner* — Nicholas G Giles
(74) *Attorney, Agent, or Firm* — CHIP LAW GROUP

(57) ABSTRACT

The present technology relates to a lens device, a control method, and an imaging system capable of improving the accuracy of zoom tracking.

A lens device according to one aspect of the present technology calculates an instruction locus, which is a locus of a position of the zoom lens at each time after a start timing of a control cycle of the zoom lens, on the basis of the target position indicated by an instruction value fetched before the start timing, and controls driving of a first actuator on the basis of the instruction locus when the start timing has come. A control unit performs calculation of zoom tracking after the start timing on the basis of a predicted position of the zoom lens obtained from the instruction locus. The present technology can be applied to a lens device of an interchangeable lens camera.

11 Claims, 10 Drawing Sheets

(56) References Cited

FOREIGN PATENT DOCUMENTS

| | | | |
|----|------------|----|---------|
| JP | 2016-224096 | A | 12/2016 |
| JP | 2017-147720 | A | 8/2017 |
| JP | 2020-148841 | A | 9/2020 |
| JP | 2021-047296 | A | 3/2021 |
| WO | 2010/029686 | A1 | 3/2010 |

* cited by examiner

LENS DEVICE, CONTROL METHOD, AND IMAGING SYSTEM

CROSS REFERENCE TO RELATED APPLICATIONS

This application is a U.S. National Phase of International Patent Application No. PCT/JP2023/009879 filed on Mar. 14, 2023, which claims priority benefit of Japanese Patent Application No. JP 2022-060690 filed in the Japan Patent Office on Mar. 31, 2022. Each of the above-referenced applications is hereby incorporated herein by reference in its entirety.

TECHNICAL FIELD

The present technology relates to a lens device, a control method, and an imaging system, and particularly relates to a lens device, a control method, and an imaging system capable of improving the accuracy of zoom tracking.

BACKGROUND ART

Some interchangeable lenses for a camera have an electric zoom function capable of electrically adjusting zoom. When the zoom lens is driven by an electric zoom, zoom tracking is performed so that a focus lens is driven to follow the zoom lens in order to maintain a focused state.

Patent Document 1 discloses a technology of predicting a position of a zoom lens and driving a focus lens on the basis of the predicted position of the zoom lens.

CITATION LIST

Patent Document

Patent Document 1: Japanese Patent Application Laid-Open No. 2020-148841

SUMMARY OF THE INVENTION

Problems to be Solved by the Invention

In an electric zoom driven by a DC motor, an error may occur in the prediction of the position of the zoom lens. In particular, an error occurs in the prediction when the zoom lens starts to move or stops. Furthermore, an error also occurs in a case where the driving speed of the zoom lens is not constant. In a case where an error occurs in the prediction of the position of the zoom lens, the focus lens cannot be driven to an optimum position, and defocus occurs.

The present technology has been made in view of such circumstances, and it is possible to improve the accuracy of zoom tracking.

Solutions to Problems

A lens device according to one aspect of the present technology includes: a control unit configured to calculate a target position of a zoom lens at each time, the zoom lens being controlled by a first actuator; and an arithmetic unit configured to calculate an instruction locus, which is a locus of a position of the zoom lens at each time after a start timing of a control cycle of the zoom lens, on the basis of the target position indicated by an instruction value fetched from the control unit before the start timing, and control driving of the first actuator on the basis of the instruction locus when the start timing has come. The control unit performs calculation of zoom tracking after the start timing on the basis of a predicted position of the zoom lens obtained from the instruction locus.

In the present technology, an instruction locus, which is a locus of a position of the zoom lens at each time after a start timing of a control cycle of the zoom lens, is calculated on the basis of the target position indicated by an instruction value fetched from the control unit before the start timing, and driving of the first actuator is controlled on the basis of the instruction locus when the start timing has come. Furthermore, the calculation of zoom tracking after the start timing is performed on the basis of a predicted position of the zoom lens obtained from the instruction locus.

BRIEF DESCRIPTION OF DRAWINGS

FIG. 2 is a block diagram illustrating a configuration example of a lens device.

FIG. 10 is a block diagram illustrating another configuration example of the imaging system.

MODE FOR CARRYING OUT THE INVENTION

Hereinafter, modes for carrying out the present technology will be described. The description will be given in the following order.

1. Configuration example of imaging system
2. Example of zoom control/focus control
3. Operation of lens device 12
4. Others

Configuration Example of Imaging System

Figure 1:
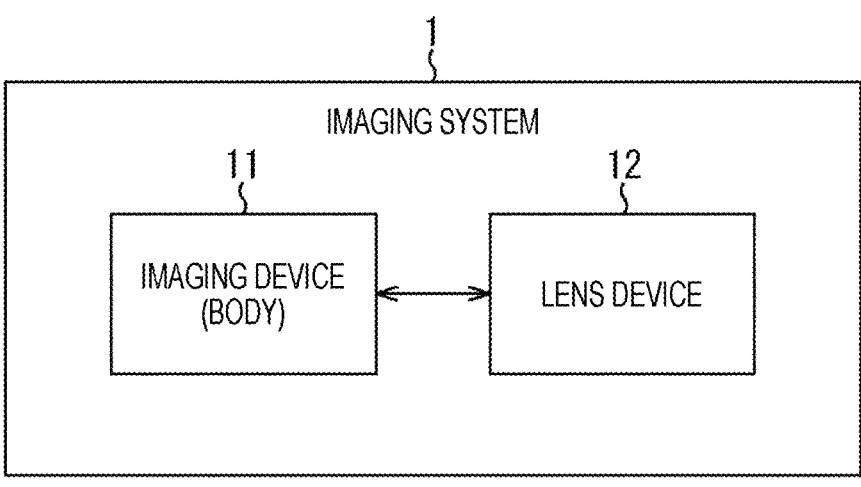
FIG. 1 is a block diagram illustrating a configuration example of an imaging system according to an embodiment of the present technology.

FIG. 1 is a block diagram illustrating a configuration example of an imaging system according to an embodiment of the present technology.

An imaging system 1 in FIG. 1 includes an imaging device 11 and a lens device 12.

The imaging device 11 is a body of an interchangeable lens camera. The lens device 12 can be attached to and detached from the imaging device 11. The imaging device 11 receives light from a subject guided by the lens device 12 and performs imaging.

The lens device 12 is an interchangeable lens having optical members such as a zoom lens and a focus lens in a barrel. The lens device 12 has an electric zoom function. The lens device 12 is also provided with members such as an actuator that drives the zoom lens and the focus lens. The lens device 12 captures light from the subject and causes the light to enter an imaging element provided in the imaging device 11.

The imaging device 11 and the lens device 12 are electrically connected via terminals provided on mount portions of the respective housings. As indicated by a bidirectional arrow in FIG. 1, various types of information are transmitted and received between the imaging device 11 and the lens device 12. For example, information indicating control contents of the zoom lens and information indicating control contents of the focus lens are transmitted from the imaging device 11 to the lens device 12.

Figure 2:
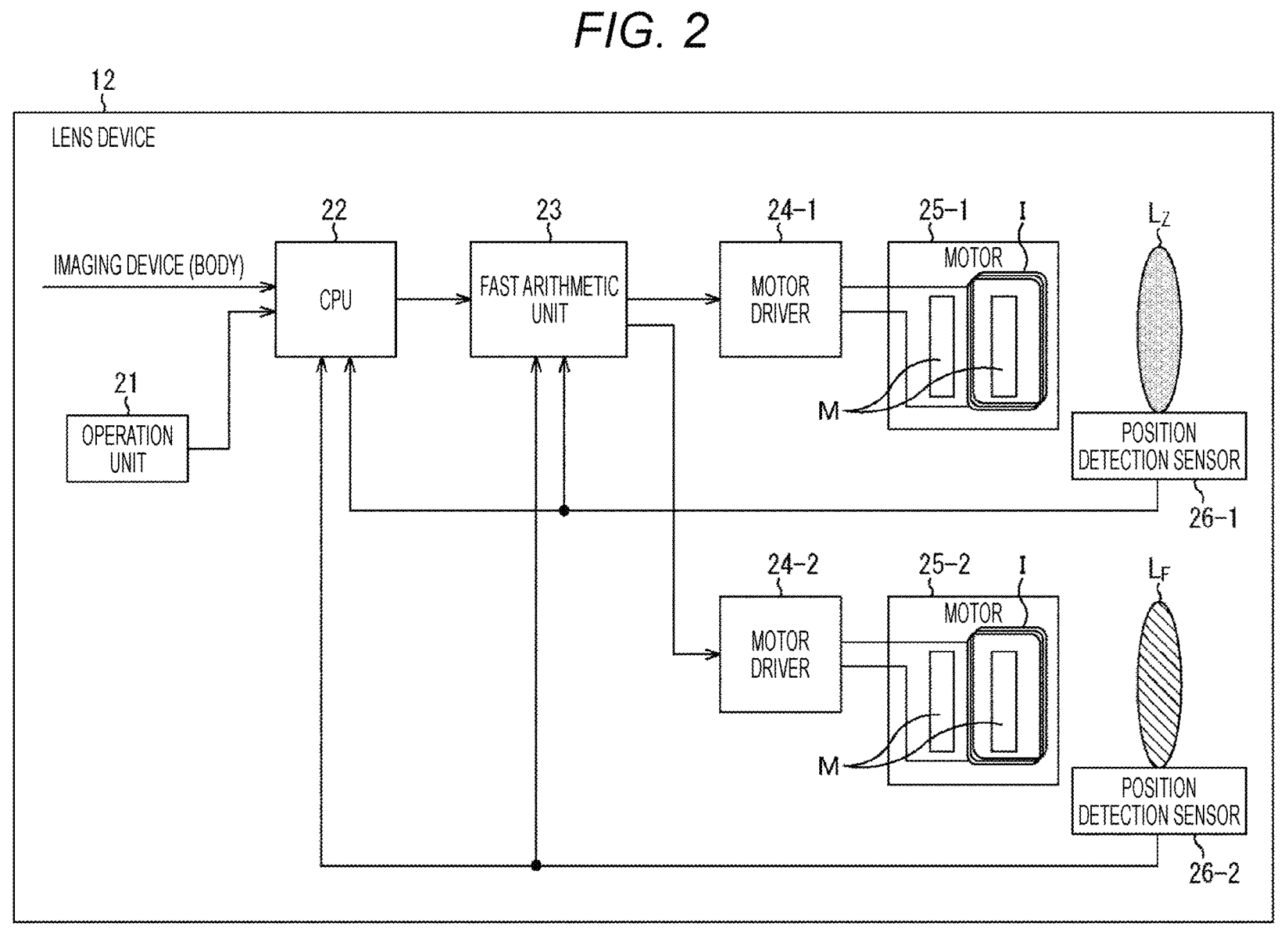

FIG. 2 is a block diagram illustrating a configuration example of the lens device 12.

As illustrated on the right side of FIG. 2, the lens device 12 is provided with a zoom lens $L_Z$ and a focus lens $L_F$. Furthermore, the lens device 12 is provided with an operation unit 21, a CPU 22, a fast arithmetic unit 23, motor drivers 24-1 and 24-2, motors 25-1 and 25-2, and position detection sensors 26-1 and 26-2. Information output from the imaging device 11 is input to the CPU 22.

The operation unit 21 is an input device including a ring member, a lever member, and the like. In a case where zoom operation or the like is performed by a user, the operation unit 21 outputs information indicating the contents of the user's operation to the CPU 22.

The CPU 22 controls driving of the zoom lens $L_Z$ and the focus lens $L_F$ on the basis of the information supplied from the imaging device 11, or on the basis of the information supplied from the operation unit 21 in response to the user's operation. The CPU 22 functions as a control unit that controls driving of the zoom lens $L_Z$ and the focus lens $L_F$.

For example, the CPU 22 outputs information on a drive instruction for the zoom lens $L_Z$ and a drive instruction for the focus lens $L_F$ to the fast arithmetic unit 23. The information on the drive instruction includes information indicating a target position of the lens to be driven.

In the lens device 12, a linear actuator having high-speed performance, quietness, and high followability is used as an actuator that drives the zoom lens $L_Z$. A linear actuator is a device that converts power generated by a motor into power in a linear direction. The drive instruction for the zoom lens $L_Z$ by the CPU 22 is performed by designating a position.

Furthermore, the CPU 22 performs zoom tracking while the zoom lens $L_Z$ is driven. The zoom tracking is processing by which the focus lens $L_F$ is driven to follow the zoom lens $L_Z$ in order to maintain a focused state, even when the zoom lens $L_Z$ is driven.

At the time of the zoom tracking, the CPU 22 calculates a driving direction, a driving amount, and the like of the focus lens $L_F$, and outputs information on the drive instruction to the fast arithmetic unit 23. In a case where a linear actuator is used as an actuator that drives the focus lens $L_F$, the drive instruction for the focus lens $L_F$ by the CPU 22 is performed by designating a position.

The fast arithmetic unit 23 is an arithmetic unit that performs servo arithmetic operation using a feedback mechanism at a high speed. The fast arithmetic unit 23 performs zoom control and focus control.

The zoom control is processing of controlling the driving of the zoom lens $L_Z$ on the basis of an instruction value from the CPU 22. The focus control is processing of controlling the driving of the focus lens $L_F$ on the basis of an instruction value from the CPU 22.

At the time of the zoom control, the fast arithmetic unit 23 adjusts a voltage of a signal to the motor driver 24-1 on the basis of the information supplied from the CPU 22 and drives the zoom lens $L_Z$. For example, the fast arithmetic unit 23 calculates the position of the zoom lens $L_Z$ at each time on the basis of the information of the drive instruction from the CPU 22, and controls the signal to the motor driver 24-1 so that the zoom lens $L_Z$ follows the locus of the position at each time obtained by the calculation.

At the time of focus control, the fast arithmetic unit 23 adjusts a voltage of a signal to the motor driver 24-2 on the basis of the information supplied from the CPU 22 and drives the focus lens $L_F$.

Note that the CPU 22 and the fast arithmetic unit 23 are implemented by, for example, a one-chip microcomputer (microcomputer). The CPU 22 and the fast arithmetic unit 23 may be implemented by microcomputers of different chips.

The motor driver 24-1 drives a motor 25-1 according to a signal supplied from the fast arithmetic unit 23, the motor 25-1 being a motor (linear motor) constituting a linear actuator. The position of the zoom lens $L_Z$ is adjusted to an arbitrary position by driving the motor 25-1.

The motor 25-1 includes a coil I and a magnet M. The motor 25-1 is driven on the basis of a signal supplied from the motor driver 24-1.

The position detection sensor 26-1 detects the position of the zoom lens $L_Z$ and outputs a signal indicating a detection result. The signal output from the position detection sensor 26-1 is supplied to the CPU 22 and the fast arithmetic unit 23. The drive control of the zoom lens $L_Z$ is performed on the basis of the detection result of the position detection sensor 26-1, so that a feedback mechanism capable of controlling the position of the zoom lens $L_Z$ to an arbitrary position is implemented.

The motor driver 24-2 drives the motor 25-2 on the basis of a signal supplied from the fast arithmetic unit 23. The position of the focus lens $L_F$ is adjusted to an arbitrary position by driving the motor 25-2.

The motor 25-2 includes a coil I and a magnet M. The motor 25-2 is driven on the basis of a signal supplied from the motor driver 24-2.

The position detection sensor 26-2 detects the position of the focus lens $L_F$ and outputs a signal indicating a detection result. The signal output from the position detection sensor 26-2 is supplied to the CPU 22 and the fast arithmetic unit 23. The drive control of the focus lens $L_F$ is performed on the basis of the detection result of the position detection sensor 26-2, so that a feedback mechanism capable of controlling the position of the focus lens $L_F$ to an arbitrary position is implemented.

Figure 3:
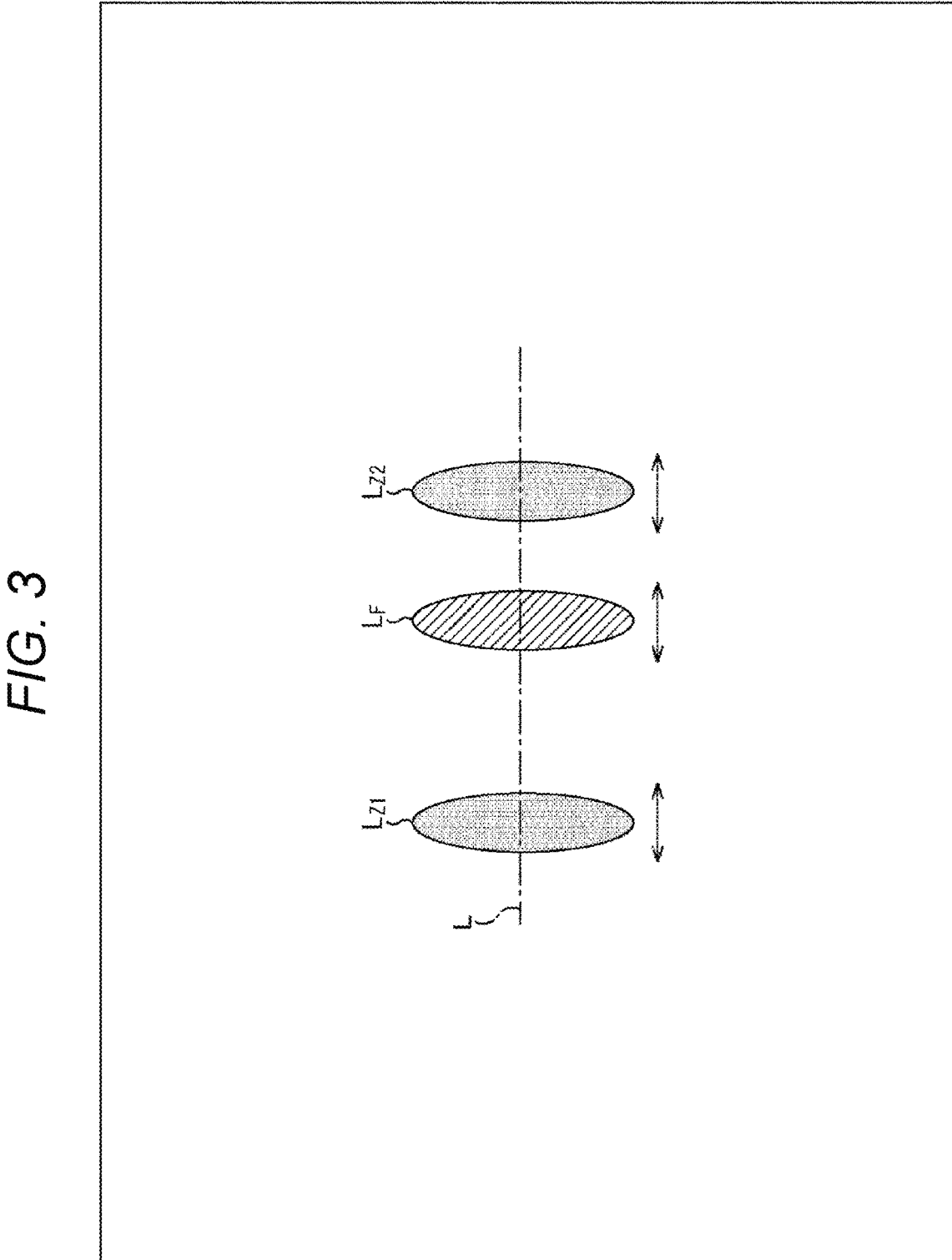
FIG. 3 is a diagram illustrating an example of a lens configuration.

FIG. 3 is a diagram illustrating an example of a lens configuration.

As illustrated in FIG. 3, the focus lens $L_F$ is provided between a zoom lens $L_{Z1}$ and a zoom lens $L_{Z2}$. For example, the left side and the right side of FIG. 3 are the distal end side and the image plane side of the lens device 12, respectively. A dash-dotted line L represents an optical axis.

Each of the zoom lenses $L_{Z1}$ and $L_{Z2}$ and the focus lens $L_F$ is configured as a lens group of a plurality of lenses. A plurality of focus lens groups may be provided.

A linear actuator is used as an actuator for driving each of the zoom lenses $L_{Z1}$ and $L_{Z2}$. A linear actuator may be used as an actuator for driving the focus lens $L_F$.

Instead of linear actuators, other actuators such as a linear drive type ultrasonic motor that has high followability and is capable of controlling the position of a lens may be used as an actuator for driving the zoom lenses $L_{Z1}$ and $L_{Z2}$ and the focus lens $L_F$.

Example of Zoom Control/Focus Control

Example of General Control

Figure 4:
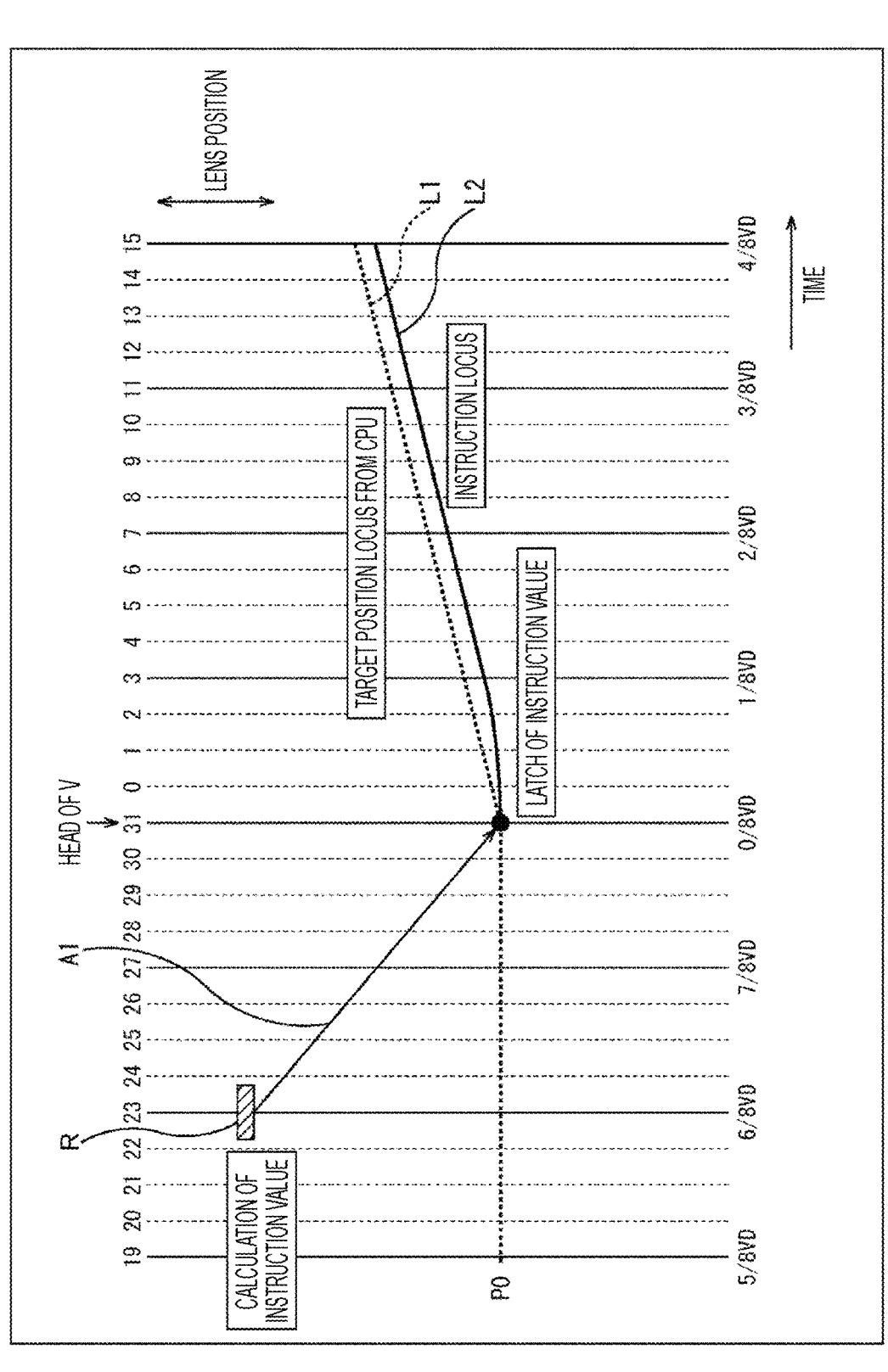
FIG. 4 is a diagram illustrating an example of general zoom control.

FIG. 4 is a diagram illustrating an example of general zoom control.

In FIG. 4, the horizontal axis represents time, and the vertical axis represents the position of the zoom lens $L_Z$. Each time will be shown with numerals indicated in the upper part of FIG. 4. The same applies to FIGS. 5 to 8.

In the example of FIG. 4, the entire of a servo cycle (V) for one cycle defined by a predetermined frequency such as 60 Hz or 120 Hz is divided into 32 sections, and the timing at time t31 is indicated as the start timing of the servo cycle.

The start timing of the servo cycle is defined by, for example, a vertical synchronization signal supplied from a synchronization control unit (not illustrated) to the CPU 22 and the fast arithmetic unit 23. Transmission and reception of information between the CPU 22 and the fast arithmetic unit 23 are appropriately performed at timing of each time.

The instruction value of zoom lens $L_Z$ is latched at each servo cycle. The instruction value of the zoom lens $L_Z$ is a value for instructing the target position of the zoom lens $L_Z$ at each time. The instruction value of the zoom lens $L_Z$ is included in the drive instruction from the CPU 22 to the fast arithmetic unit 23.

The servo cycle is a cycle (cycle of zoom control) in which the fast arithmetic unit 23 latches the instruction value calculated by the CPU 22 and controls the driving of the zoom lens $L_Z$ according to the instruction locus obtained on the basis of the instruction value. The drive control of the zoom lens $L_Z$ is performed so that the position of the zoom lens $L_Z$ at each time follows the position indicated by the instruction locus.

FIG. 4 illustrates an example in a case where the CPU 22 calculates the instruction value at a timing of time t23 in a state where a position P0 is indicated as a target position of the zoom lens $L_Z$. The instruction value is calculated when a zoom operation or the like is performed and information indicating the contents of operation is input to the CPU 22. Note that, in FIG. 4, a rectangle R indicates the calculation timing of the instruction value, but the position of the rectangle R on the vertical axis does not indicate the position of the calculation result.

In a case where the calculation of the instruction value is performed at the timing of time t23, the information of the instruction value of the calculation result is latched (captured) by the fast arithmetic unit 23 at a timing of time t31, which is the start timing of the servo cycle, as indicated by a tip of arrow A1, and the instruction locus is obtained.

The instruction locus is calculated, for example, by applying filter processing based on characteristics or the like of the actuator to a target position represented by the instruction value at each time. The instruction locus is a locus of a position at each time that the zoom lens $L_Z$ is actually caused to follow. When a linear actuator having high followability is used to drive the zoom lens $L_Z$, the position of the zoom lens $L_Z$ is adjusted with substantially the same locus as the instruction locus.

A dotted line L1 in FIG. 4 indicates the target position locus which is the locus of the target position at each time. In FIG. 4, a locus along which the zoom lens $L_Z$ is caused to move in the positive direction is illustrated as the target position locus with reference to the position P0. In contrast, a solid line L2 indicates an instruction locus. In this manner, the instruction locus is a locus deviated from the target position locus.

Figure 5:
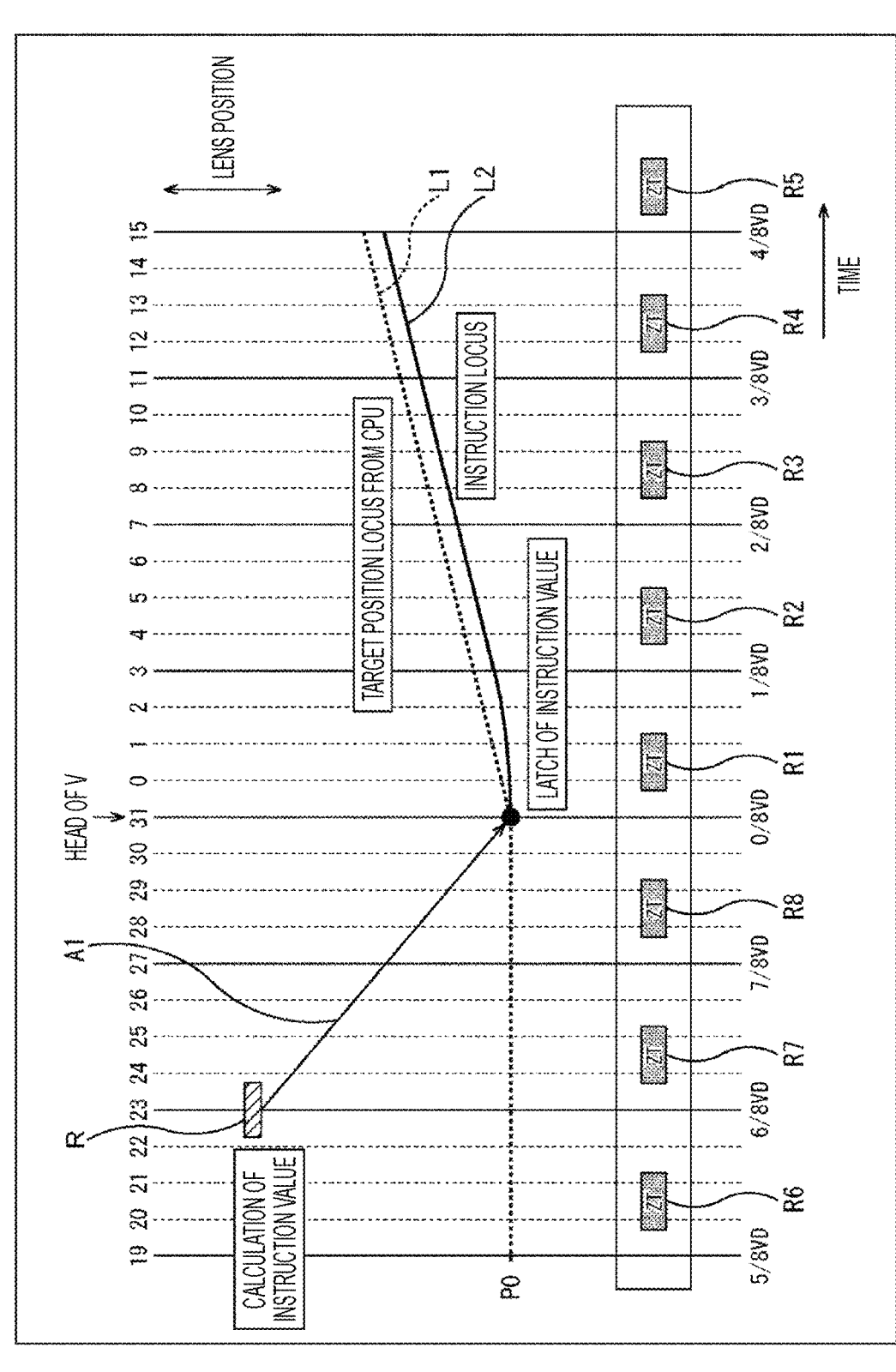
FIG. 5 is a diagram illustrating an example of focus control timing.

FIG. 5 is a diagram illustrating an example of focus control timing.

Rectangles R1 to R8 arranged in the lower part of FIG. 5 indicate timings of zoom tracking. The zoom tracking is performed by the CPU 22 in a cycle, for example, a ⅛·V cycle shorter than the servo cycle. In the example of FIG. 5, the zoom tracking is performed eight times in one servo cycle.

The general zoom tracking in which the CPU 22 calculates the position of the focus lens $L_F$ on the basis of the position of the zoom lens $L_Z$ detected by, for example, the position detection sensor 26-1 is performed.

For example, the first zoom tracking is performed by the CPU 22 at a timing near time t0 to t1 indicated by the rectangle R1. The CPU 22 performs calculation based on the position of the zoom lens $L_Z$ detected by the position detection sensor 26-1, and the fast arithmetic unit 23 performs drive control of the focus lens $L_F$ on the basis of the calculation result by the CPU 22. The drive control of the focus lens $L_F$ is performed after the zoom tracking by the CPU 22 and, for example, before the timing of the second zoom tracking.

The second zoom tracking and subsequent zoom tracking are also performed at respective timings indicated by the rectangles R2 and thereafter.

As described above, the fast arithmetic unit 23 latches the instruction value of the CPU 22 at the start timing of the servo cycle and causes the zoom lens $L_Z$ is moved according to the instruction locus obtained on the basis of the instruction value, so that general zoom control is performed.

Furthermore, the fast arithmetic unit 23 drives the focus lens $L_F$ on the basis of the calculation result by the CPU 22 using the position detected by the position detection sensor 26-1, so that general focus control is performed.

Example of Control According to an Embodiment
of the Present Technology

Figure 6:
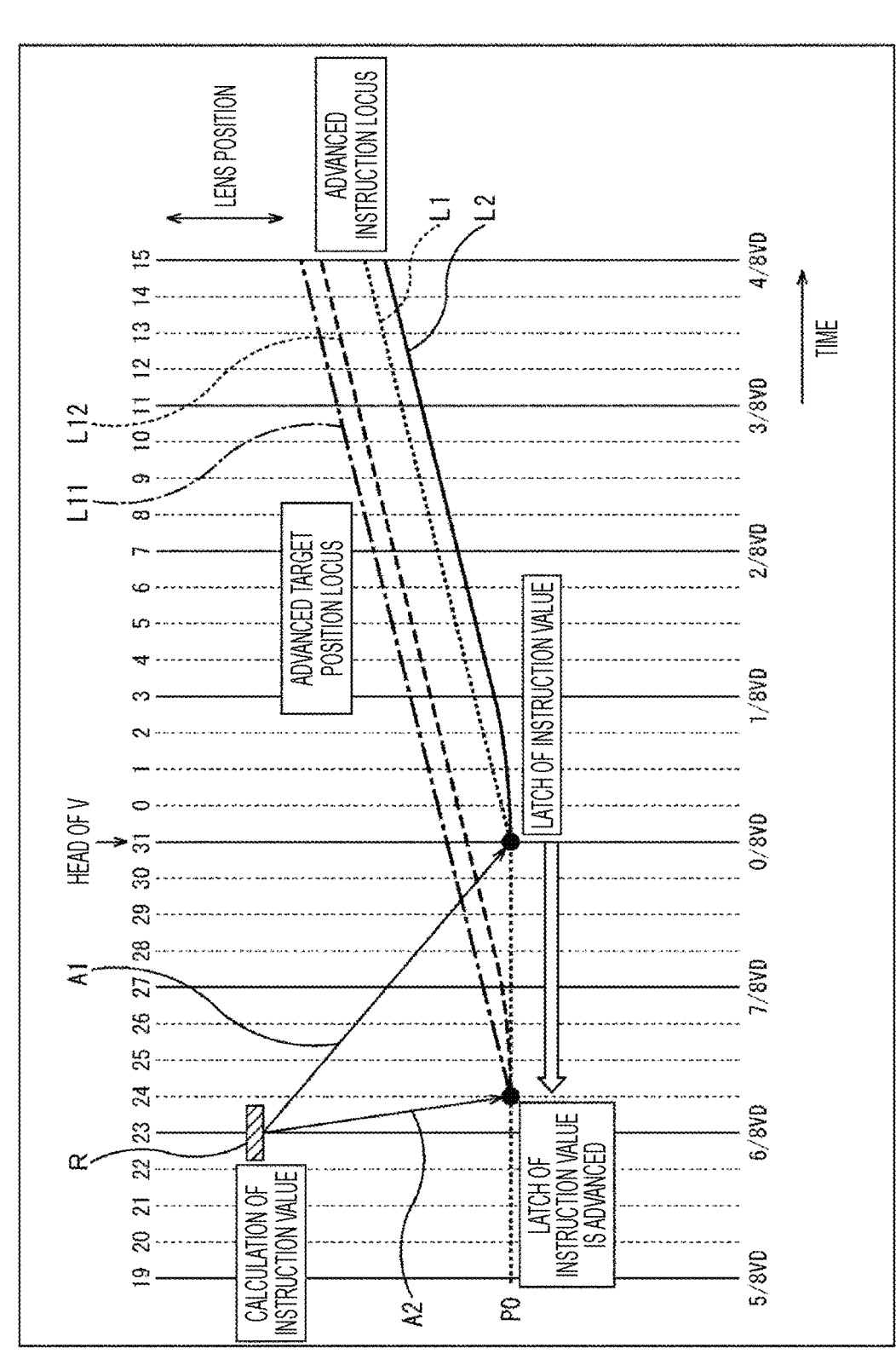
FIG. 6 is a diagram illustrating an example of zoom control.

FIG. 6 is a diagram illustrating an example of the zoom control according to an embodiment of the present technology. Description overlapping with the above description will be appropriately omitted.

In a case where the calculation of the instruction value is performed by the CPU 22 at the timing of time t23, the instruction value indicating the target position at each time is latched by the fast arithmetic unit 23 at a timing of time t24 as indicated by a tip of arrow A2 in FIG. 6. That is, the latch of the instruction value is advanced without waiting for the start timing of the servo cycle. For comparison, a state in a case where the instruction value is latched at the start timing of the servo cycle is illustrated in FIG. 6.

The advancement amount of the latch of the instruction value is a period longer than ⅛·V cycle which is a period for one cycle of the focus control (zoom tracking). In the example of FIG. 6, the latch of the instruction value is advanced by a period corresponding to 7 time slots, which is longer than the period corresponding to 4 time slots, which is a period corresponding to ⅛·V cycle. As described above, the latch of the instruction value is performed at a timing before the period of ⅛·V cycle or more with reference to the start timing of the servo cycle.

After the latch of the instruction value is advanced, the calculation of the instruction locus is performed by the fast arithmetic unit 23. Similarly to a case where the instruction value is latched at the start timing of the servo cycle, the instruction locus is calculated by applying filter processing based on characteristics or the like of the actuator to a target position represented by the instruction value at each time. Similarly to a case where the instruction value is latched at the start timing of the servo cycle, for example, an instruction locus for one servo cycle is obtained.

A dash-dotted line L11 in FIG. 6 indicates an advanced target position locus which is a target position locus indicated by the instruction value having been latched in advance. By contrast, a broken line L12 indicates an advanced instruction locus which is an instruction locus obtained on the basis of the instruction value having been latched in advance.

The information on the advanced instruction locus obtained in this manner is supplied from the fast arithmetic unit 23 to the CPU 22 and used for the zoom tracking.

In the CPU 22, the position of the zoom lens $L_Z$ is predicted on the basis of the advanced instruction locus, and the zoom tracking is performed using the predicted position of the zoom lens $L_Z$. Since the actual driving of the zoom lens $L_Z$ in the zoom control is started at the start timing of the servo cycle so as to follow the instruction locus (solid line L2), the advanced instruction locus is obtained for predicting the position of the zoom lens $L_Z$.

Figure 7:
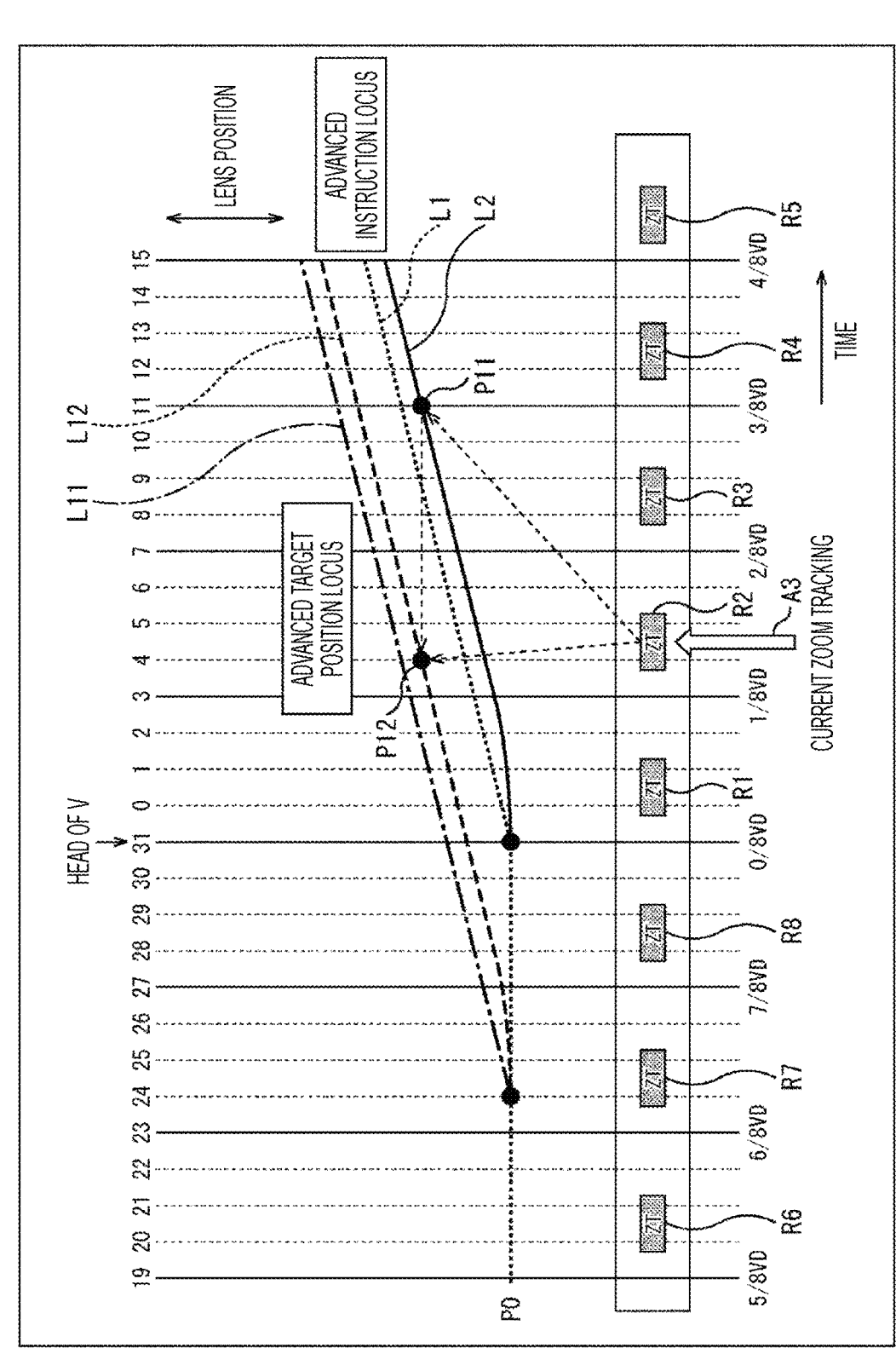
FIG. 7 is a diagram illustrating an example of focus control.

FIG. 7 is a diagram illustrating an example of the focus control according to an embodiment of the present technology.

A case where the current zoom tracking is the second processing pointed by a tip of outlined arrow A3 will be described. The second zoom tracking is performed at timing around time t4 to time t5 after $\frac{1}{8}$·V cycle of the first zoom tracking. The first zoom tracking is also performed similarly to the second zoom tracking.

In the CPU 22, the calculation of the second zoom tracking is performed with reference to the advanced instruction locus (broken line L12) and using the position P12, which is a position on the advanced instruction locus at the time t4.

That is, the position P12, which is the predicted position of the zoom lens $L_Z$, is used for the calculation of the zoom tracking without using the position of the zoom lens $L_Z$ detected by the position detection sensor 26-1. The position P12 used for the calculation of the zoom tracking corresponds to a position where the position P11 of the zoom lens $L_Z$ in the next cycle is advanced by 7 time slots corresponding to the advancement amount.

The fast arithmetic unit 23 performs the drive control of the focus lens $L_F$ on the basis of such a calculation result using the predicted position of the zoom lens $L_Z$. The drive control of the focus lens $L_F$ is performed after the zoom tracking by the CPU 22 and, for example, before the timing of the third zoom tracking.

As described above, in the CPU 22, the position of the zoom lens $L_Z$ is predicted by referring to the advanced instruction locus obtained by advanced the instruction locus which is actually followed by the zoom lens $L_Z$. Furthermore, the zoom tracking is calculated using the predicted position of the zoom lens $L_Z$.

By performing the focus control on the basis of the calculation result by the CPU 22, the focus lens $L_F$ can be driven to follow the actual position of the zoom lens $L_Z$. Even in a case where the driving speed of zoom lens $L_Z$ is not constant, zoom tracking with high accuracy can be performed.

Furthermore, in the lens device 12, a linear actuator is used to drive the zoom lens $L_Z$. Compared to a case where a DC motor or the like is used, fast and silent zoom control can be performed.

Figure 8:
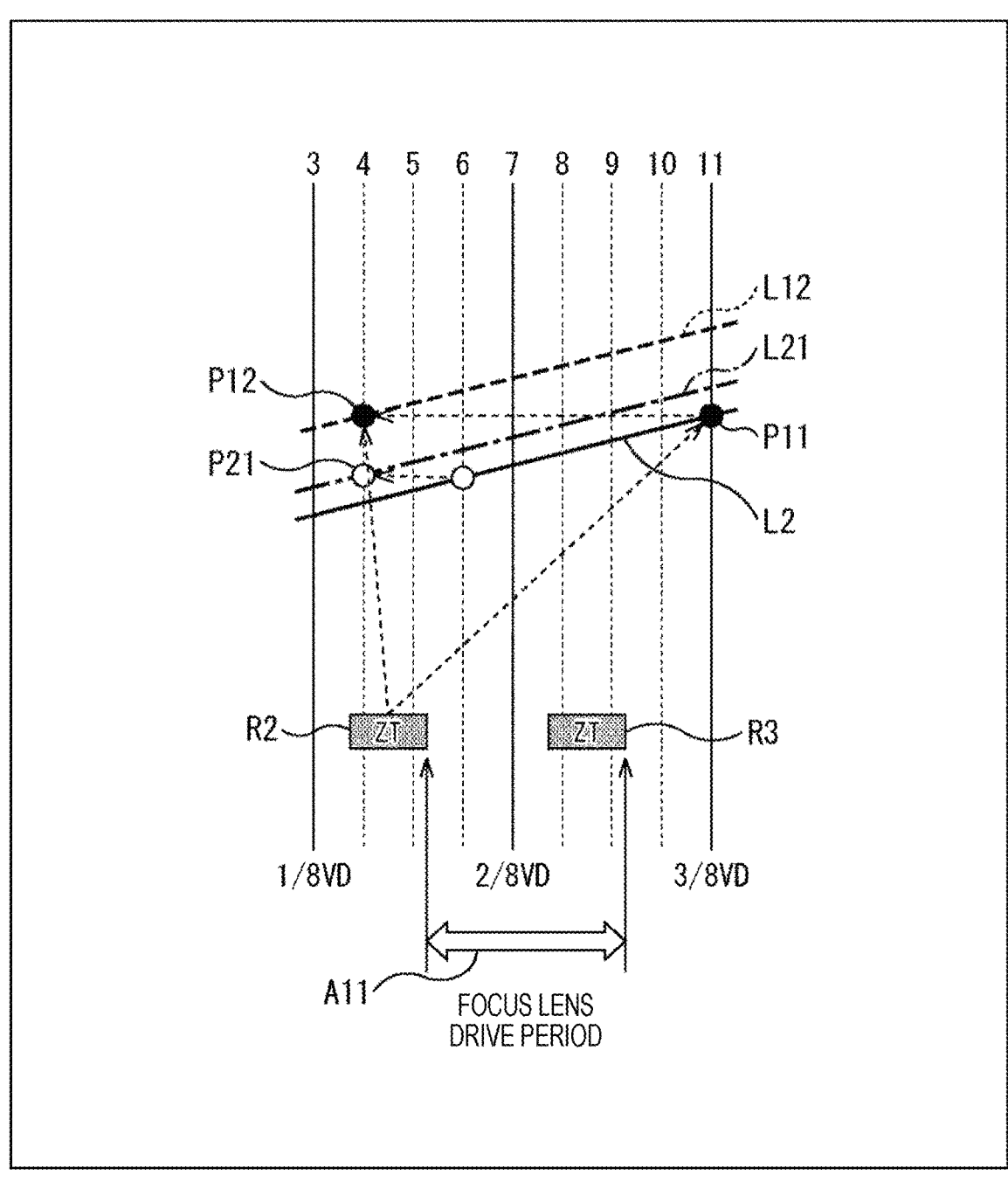
FIG. 8 is a diagram illustrating an example of advancement amount.

FIG. 8 is a diagram illustrating an example of advancement amount.

As indicated by an arrow A11 in FIG. 8, the focus control based on the instruction value obtained by the calculation of the second zoom tracking is performed before the timing of the third zoom tracking which is the next zoom tracking. In the example of FIG. 8, the focus control is performed before the end timing of the third zoom tracking.

As described above, the advancement amount of the latch of the instruction value and the advancement amount of the advanced instruction locus with respect to the instruction locus are set as a period longer than the $\frac{1}{8}$·V cycle that is the focus control cycle. By setting the advancement amount to a period longer than $\frac{1}{8}$·V cycle, it is possible to predict the position of the zoom lens $L_Z$ at the time of the zoom tracking in the next cycle and use the predicted position for the calculation of the zoom tracking.

In a case where the advancement amount is a period shorter than $\frac{1}{8}$·V cycle as indicated by a dash-dotted line L21, only the position of the zoom lens $L_Z$ within the cycle of the current zoom tracking can be predicted as the indicated position P21. By setting the advancement amount to a period longer than $\frac{1}{8}$·V cycle, the position of the zoom lens $L_Z$ in the next cycle can be predicted.

Operation of Lens Device 12

Figure 9:
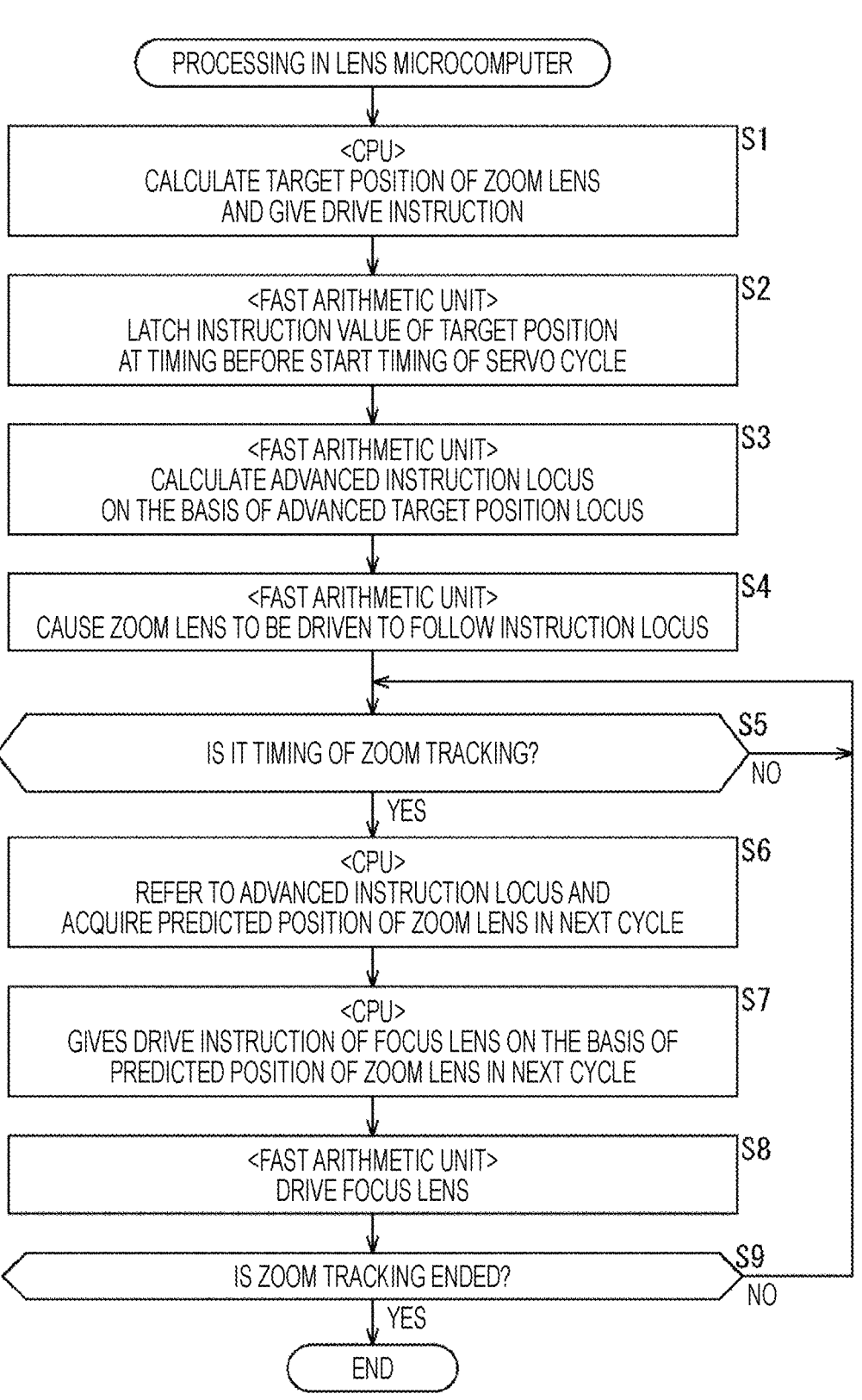
FIG. 9 is a flowchart for describing a series of processing in a lens microcomputer.

A series of processes of the lens microcomputer (CPU 22, fast arithmetic unit 23) will be described with reference to the flowchart of FIG. 9. The processing of FIG. 9 is started, for example, when a zoom operation is performed by the user and information indicating the contents of the user's operation is input to the CPU 22.

In step S1, the CPU 22 calculates the target position of the zoom lens $L_Z$ and gives a drive instruction to the fast arithmetic unit 23.

In step S2, the fast arithmetic unit 23 latches the instruction value of the target position at a timing before the start timing of the servo cycle.

In step S3, the fast arithmetic unit 23 calculates the advanced instruction locus on the basis of the advanced target position locus represented by the instruction value having been latched in advance.

When the start timing of servo synchronization has come, in step S4, the fast arithmetic unit 23 causes the zoom lens $L_Z$ to be driven to follow the instruction locus. The drive control of the zoom lens $L_Z$ is continued during the servo cycle.

In step S5, the CPU 22 determines whether or not it is the timing of the zoom tracking, and waits until it is determined that it is the timing of the zoom tracking.

In a case where it is determined in step S5 that it is the timing of the zoom tracking, the CPU 22 refers to the advanced instruction locus obtained by the fast arithmetic unit 23 and acquires the predicted position of the zoom lens $L_Z$ in the next cycle in step S6.

In step S7, the CPU 22 gives the drive instruction of the focus lens $L_F$ on the basis of the predicted position of the zoom lens $L_Z$ in the next cycle.

In step S8, the fast arithmetic unit 23 drives the focus lens $L_F$.

In step S9, the CPU 22 determines whether or not the zoom tracking is ended, and in a case where it is determined that the zoom tracking is not ended, the processing returns to step S5 and the above-described processing is repeated.

For example, in a case where it is determined in step S9 that the zoom tracking is ended since the zoom tracking has been performed eight times, the processing of the lens microcomputer ends. The above processing is, for example, repeated for each servo cycle.

As described above, in the lens device 12, the zoom control is performed to follow the instruction locus which is a locus different from the target position locus. The fast arithmetic unit 23 can use any filter processing (digital filter) for the calculation of the instruction locus and the calculation of the advanced instruction locus. Furthermore, the fast arithmetic unit 23 can cause the actuator to robustly follow the target position by using non-linear control (VSS or switching control) as the zoom control based on the instruction locus.

Furthermore, by using a linear actuator for driving the zoom lens $L_Z$, it is possible to perform fast and silent zoom control.

In the electric zoom driven by a DC motor, since a driving sound due to meshing of gears is generated at the time of driving, there is a limit to fast driving. Furthermore, since the mechanically connected mechanism is rotated by the motor, the rotation direction of a zoom ring provided in the lens barrel is fixed in a constant direction, such as a clockwise direction in the case of wide-direction driving and a counterclockwise direction in the case of tele-direction driving. The use of a linear actuator for driving the zoom lens $L_Z$ can prevent such a circumstance.

By performing the calculation of the zoom tracking using the predicted position of the zoom lens $L_Z$ based on the advanced instruction locus, it is possible to improve the accuracy of the zoom tracking of the zoom lens $L_Z$ with an inconstant speed with respect to an arbitrary drive locus.

For example, in a case where a method of predicting the position of the drive instruction of the zoom lens as it is as the position of the zoom lens of the next cycle is used, depending on a servo algorithm, a stationary deviation occurs, or the locus of the driving instruction and the locus actually following the driving instruction do not coincide with each other, but such a situation can be prevented.

Others

Figure 10:
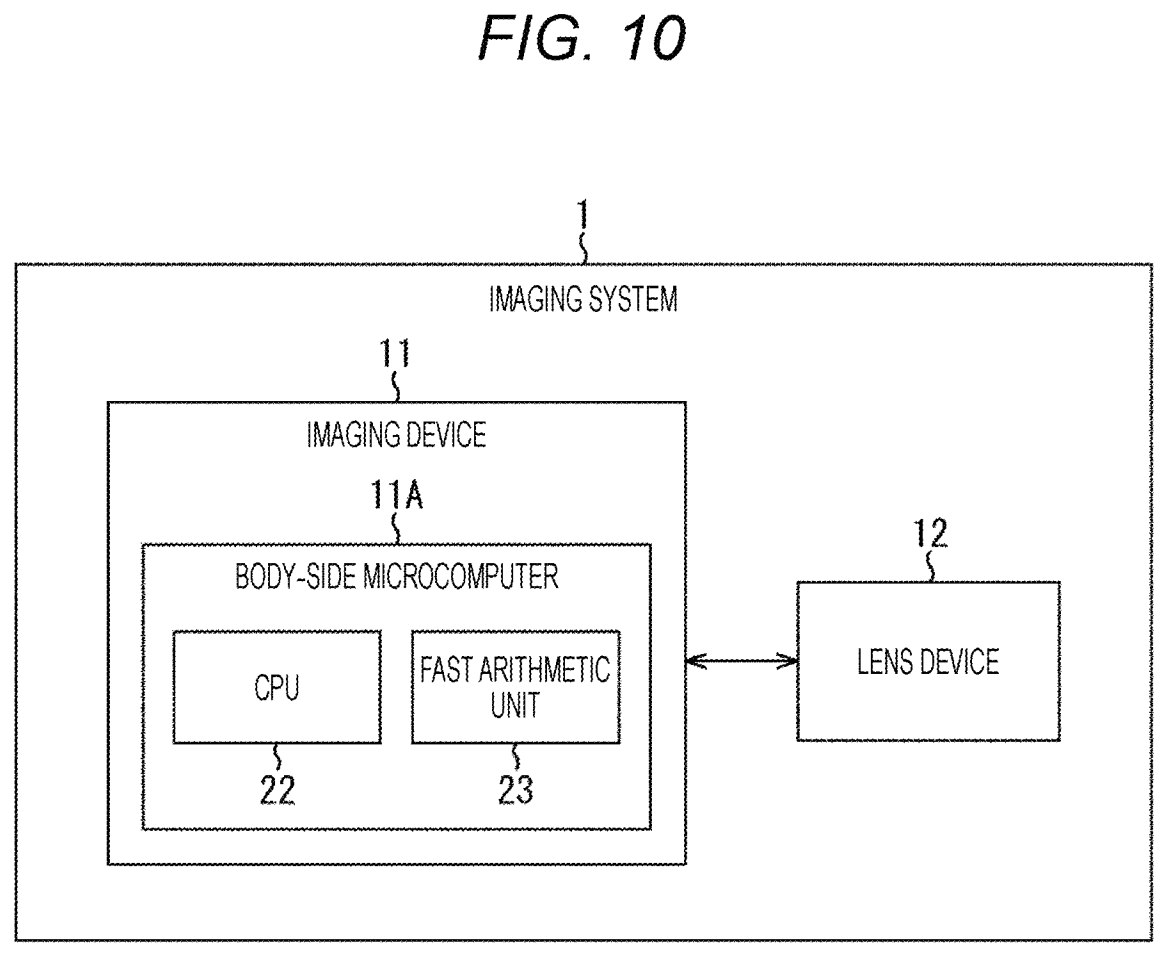

FIG. 10 is a block diagram illustrating another configuration example of the imaging system 1.

As illustrated in FIG. 10, the functions of the CPU 22 and the fast arithmetic unit 23 may be implemented in a body-side microcomputer 11A that is a microcomputer on the imaging device 11 side. In this case, the drive control for the actuator in the lens device 12 is performed by the fast arithmetic unit 23 of the body-side microcomputer 11A, and the above-described zoom control and focus control are realized.

Although the imaging system 1 is an interchangeable lens camera, the above-described zoom control and focus control can also be applied to a lens-integrated camera.

Although the target position locus and the instruction locus are loci for linearly controlling the position of the zoom lens $L_Z$, in the lens device 12, the drive control of the zoom lens $L_Z$ is appropriately performed using a non-linear locus.

In the present description, a system means a set of a plurality of components (devices, modules (parts), and the like), and it does not matter whether or not all the components are in the same housing. Therefore, a plurality of devices housed in separate housings and connected to each other via a network and one device in which a plurality of modules is housed in one housing are both systems.

The effects described in the specification are merely examples and are not limited, and other effects may be provided.

An embodiment of the present technology is not limited to the embodiment described above, and various modifications can be made without departing from the scope of the present technology.

Examples of Combinations of Configurations

The present technology can also be configured as follows.

(1)

A lens device including:

a control unit configured to calculate a target position of a zoom lens at each time, the zoom lens being controlled by a first actuator; and an arithmetic unit configured to calculate an instruction locus, which is a locus of a position of the zoom lens at each time after a start timing of a control cycle of the zoom lens, on the basis of the target position indicated by an instruction value fetched from the control unit before the start timing, and control driving of the first actuator on the basis of the instruction locus when the start timing has come, in which the control unit performs calculation of zoom tracking after the start timing on the basis of a predicted position of the zoom lens obtained from the instruction locus.

(2)

The lens device according to (1), in which the arithmetic unit drives, on the basis of a calculation result of the zoom tracking, a second actuator configured to control a focus lens, and controls tracking of the focus lens with respect to the zoom lens.

(3)

The lens device according to (2), in which the arithmetic unit performs drive control of the first actuator in a first cycle, and performs drive control of the second actuator in a second cycle shorter than the first cycle.

(4)

The lens device according to (3), in which the arithmetic unit fetches the instruction value from the control unit at a timing before a period of the second cycle or more with reference to the start timing.

(5)

The lens device according to (3), in which the control unit performs calculation of the zoom tracking on the basis of the predicted position indicating the position of the zoom lens at the time of the zoom tracking in the next cycle.

(6)

The lens device according to any one of (1) to (5), in which the arithmetic unit performs calculation including the same filter processing as filter processing at the time when the instruction value was latched at the start timing, and obtains the instruction locus.

(7)

The lens device according to (2), further including:

the zoom lens;

the first actuator;

the focus lens; and the second actuator.

(8)

The lens device according to (7), in which the first actuator is a linear actuator.

(9)

The lens device according to any one of (1) to (5), further including a microcomputer including the control unit and the arithmetic unit.

(10)

A control method performed by a lens device, the control method including:

calculating, with a control unit, a target position of a zoom lens at each time, the zoom lens being controlled by a first actuator;

calculating, with an arithmetic unit, an instruction locus, which is a locus of a position of the zoom lens at each time after a start timing of a control cycle of the zoom lens, on the basis of the target position indicated by an instruction value fetched from the control unit before the start timing;

controlling, with the arithmetic unit, driving of the first actuator on the basis of the instruction locus when the start timing has come; and performing, with the control unit, calculation of zoom tracking after the start timing on the basis of a predicted position of the zoom lens obtained from the instruction locus.

(11)

An imaging system including:

a lens device including a zoom lens, a first actuator configured to control the zoom lens, a focus lens, a second actuator configured to control the focus lens, a first control unit configured to calculate a target position of the zoom lens at each time, and an arithmetic unit configured to calculate an instruction locus, which is a locus of a position of the zoom lens at each time after a start timing of a control cycle of the zoom lens, on the basis of the target position indicated by an instruction value fetched from the first control unit before the start timing, and control driving of the first actuator on the basis of the instruction locus when the start timing has come, the first control unit performing calculation of zoom tracking after the start timing on the basis of a predicted position of the zoom lens obtained from the instruction locus; and an imaging device including a second control unit configured to communicate with the first control unit.

REFERENCE SIGNS LIST

1 Imaging system
11 Imaging device
12 Lens device
22 CPU
23 Fast arithmetic unit
24-1, 24-2 Motor driver
25-1, 25-2 Motor
26-1, 26-2 Position detection sensor

The invention claimed is:

1. A lens device comprising:

a control unit configured to calculate a target position of a zoom lens at each time, the zoom lens being controlled by a first actuator; and an arithmetic unit configured to calculate an instruction locus, which is a locus of a position of the zoom lens at each time after a start timing of a control cycle of the zoom lens, on a basis of the target position indicated by an instruction value fetched from the control unit before the start timing, and control driving of the first actuator on a basis of the instruction locus when the start timing has come, wherein the control unit performs calculation of zoom tracking after the start timing on a basis of a predicted position of the zoom lens obtained from the instruction locus.

2. The lens device according to claim 1, wherein the arithmetic unit drives, on a basis of a calculation result of the zoom tracking, a second actuator configured to control a focus lens, and controls tracking of the focus lens with respect to the zoom lens.

3. The lens device according to claim 2, wherein the arithmetic unit performs drive control of the first actuator in a first cycle, and performs drive control of the second actuator in a second cycle shorter than the first cycle.

4. The lens device according to claim 3, wherein the arithmetic unit fetches the instruction value from the control unit at a timing before a period of the second cycle or more with reference to the start timing.

5. The lens device according to claim 3, wherein the control unit performs calculation of the zoom tracking on a basis of the predicted position indicating the position of the zoom lens at the time of the zoom tracking in the next cycle.

6. The lens device according to claim 1, wherein the arithmetic unit performs calculation including a same filter processing as filter processing at the time when the instruction value was latched at the start timing, and obtains the instruction locus.

7. The lens device according to claim 2, further comprising:

the zoom lens;

the first actuator;

the focus lens; and the second actuator.

8. The lens device according to claim 7, wherein the first actuator is a linear actuator.

9. The lens device according to claim 1, further comprising a microcomputer including the control unit and the arithmetic unit.

10. A control method performed by a lens device, the control method comprising:

calculating, with a control unit, a target position of a zoom lens at each time, the zoom lens being controlled by a first actuator;

calculating, with an arithmetic unit, an instruction locus, which is a locus of a position of the zoom lens at each time after a start timing of a control cycle of the zoom lens, on a basis of the target position indicated by an instruction value fetched from the control unit before the start timing;

controlling, with the arithmetic unit, driving of the first actuator on a basis of the instruction locus when the start timing has come; and performing, with the control unit, calculation of zoom tracking after the start timing on a basis of a predicted position of the zoom lens obtained from the instruction locus.

11. An imaging system including:

a lens device including a zoom lens, a first actuator configured to control the zoom lens,

a focus lens, a second actuator configured to control the focus lens, a first control unit configured to calculate a target position of the zoom lens at each time, and an arithmetic unit configured to calculate an instruction locus, which is a locus of a position of the zoom lens at each time after a start timing of a control cycle of the zoom lens, on a basis of the target position indicated by an instruction value fetched from the first control unit before the start timing, and control driving of the first actuator on a basis of the instruction locus when the start timing has come, the first control unit performing calculation of zoom tracking after the start timing on a basis of a predicted position of the zoom lens obtained from the instruction locus; and an imaging device including a second control unit configured to communicate with the first control unit.

\* \* \* \* \*